(Model.)

J. WOLPERT.
SULKY PLOW.

No. 483,480.  Patented Sept. 27, 1892.

Witnesses:
Geo. C. Albaugh
M. P. Troxler

Inventor:
John Wolpert

UNITED STATES PATENT OFFICE.

JOHN WOLPERT, OF LOUISVILLE, KENTUCKY.

SULKY-PLOW.

SPECIFICATION forming part of Letters Patent No. 483,480, dated September 27, 1892.

Application filed May 21, 1892. Serial No. 433,935. (Model.)

*To all whom it may concern:*

Be it known that I, JOHN WOLPERT, a citizen of the United States, residing at Louisville, in the county of Jefferson and State of Kentucky, have invented a new and useful Improvement in Sulky-Plows, of which the following is a specification.

The object of my invention is to make the plow more simple, more useful, and more easily worked. I attain this object by the simple device of taking the inner ends of a divided axle through two parallel bars that are suitable hinged to the top of the plow-beam.

Any sulky-plow to work effectively must run one wheel in the furrow and the other wheel on the unplowed ground. This makes it needful to raise one wheel higher than the other. The ordinary way of doing this is by means of a lever to each wheel, the manipulation of which is often troublesome and always annoying—a defect which my invention proposes to cure.

Figure 1:
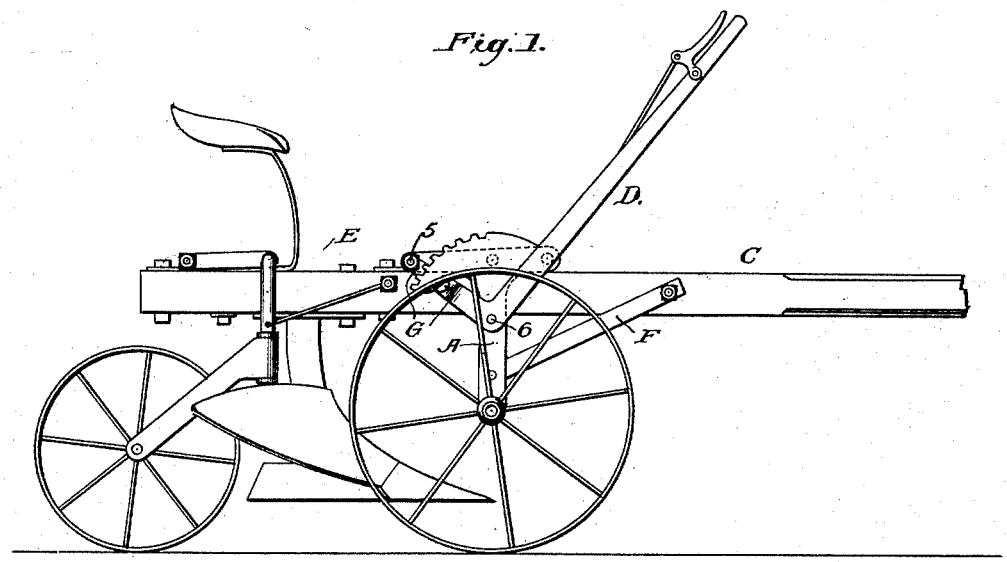
Figure 2:
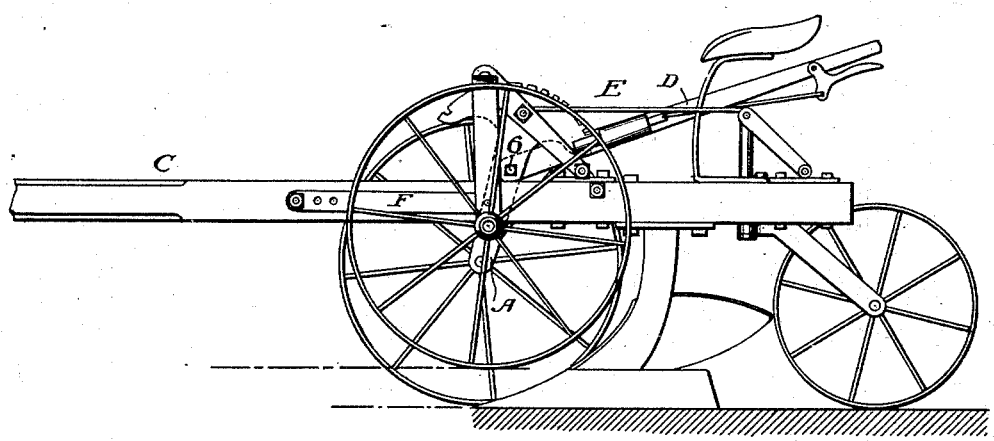
Figure 3:
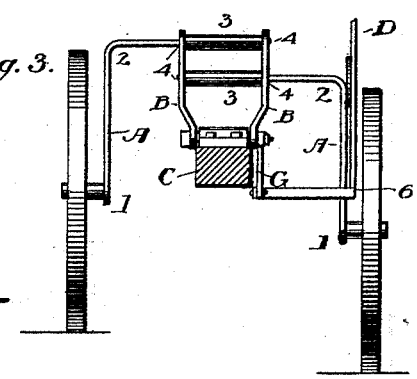

In the drawings, Figure 1 is a side view showing the lever and the link connecting it with the lower end of the parallel bars, showing the wheels on the same plane and the plow clear of the ground. Fig. 2 is a view of the other side of the plow, showing the parallel bars and the plow as it runs in the ground, the rear caster-wheel on the plow level and the principal wheels raised to the unequal heights required by the work. Fig. 3 is a cross-section at the axle.

Similar letters and figures represent the same parts in the several views.

The axle A is in two pieces, each piece bent at right angles, upward at 1 and inward at 2, and the ends 3 overlap and pass through holes 4 in the two parallel bars B and through short tubes that hold the bars apart. The lower ends of these two bars are attached at 5 by suitable hinge device to the plow-beam C. The lever D is connected with the axle at 6 and through the link-bar G at 5 with the parallel bars B. The curved braces F hold the lower part of the axles in place. When the plow is not at work and the wheels are in position for removal from one field to another, they run on the same plane. When the plowman wishes to set the plow to work, he moves the lever from front to rear, which raises the parallel bars and the inner ends of the axles and depresses the plow until it runs at such depth as he chooses. The one motion raises the wheel on the moldboard side of the plow and the caster-wheel only to the furrow level, while the land-wheel is raised to level of the unplowed land. This result is produced by putting the inner ends of the axles through the parallel bars as far apart at least as the extreme depth of furrow desired. Thus, if these inner ends of the axles are ten inches apart where they pass through the bars B, when the bars are raised to a nearly-vertical position by means of the lever D, then the land-wheel will be raised very nearly ten inches higher than the furrow-wheel and the plow will enter the ground to that depth. Changing the elevation of the bars alters the furrow depth, as may be desired. When the bars are brought to a horizontal position, the wheels will be on the same plane and the plow will be raised clear of the ground. The caster-wheel has a socket to enable it to turn a corner. The shank of the caster-wheel is bent at right angles and passes through the horizontal or oblique bearing, which is hinged to the plow-beam and connected by a rod to the right-hand axle-section and a lower rod to prevent the caster-wheel from moving backward or forward. By moving the lever forward the caster-wheel bearing will be brought to a level with the bars B. By moving the lever backward the caster-wheel bearing will be brought obliquely with bars B in connection with the rod. The bearing on the caster-wheel is shorter than that on the axle-section, giving it less motion, so as to keep the caster-wheel on a level with the plow-bottom while plowing.

What I claim as my invention, and desire to secure by Letters Patent, is—

1. The combination, with a plow-beam, of the bars B, hinged thereto, and the divided axle journaled in said bars, the land-wheel section being journaled farthest from the turning axis of the bars, whereby a differential motion may be given to the axle-sections and the land-wheel be raised by the act of lowering the plow into the ground.

2. The combination, with the divided axles and plow-beam, of the bars B, the lever D, link G, and braces F, substantially as shown and described.

3. The hinged parallel bars B and the sectional axle journaled in said bars to produce a differential motion of the axle and wheels, in combination with the plow-beam, the pivoted braces, the elbow-lever, and the link connecting it to the parallel bars, substantially as shown and described.

4. The combination, with the plow-beam and pivoted braces, of the pivoted bars or crank, the sectional axle pivoted in said bars or crank at different distances from its axis, the operating-lever and its link, the caster-wheel swiveled in a hinged socket, and the rod connecting said socket to the axle and the pivoted bars, substantially as shown and described.

JOHN WOLPERT.

Witnesses:
W. E. BUCKEL,
M. P. TROXLER.